Sept. 20, 1932.　　　　G. E. HAZARD　　　　1,877,763
VALVE
Filed Feb. 1, 1928
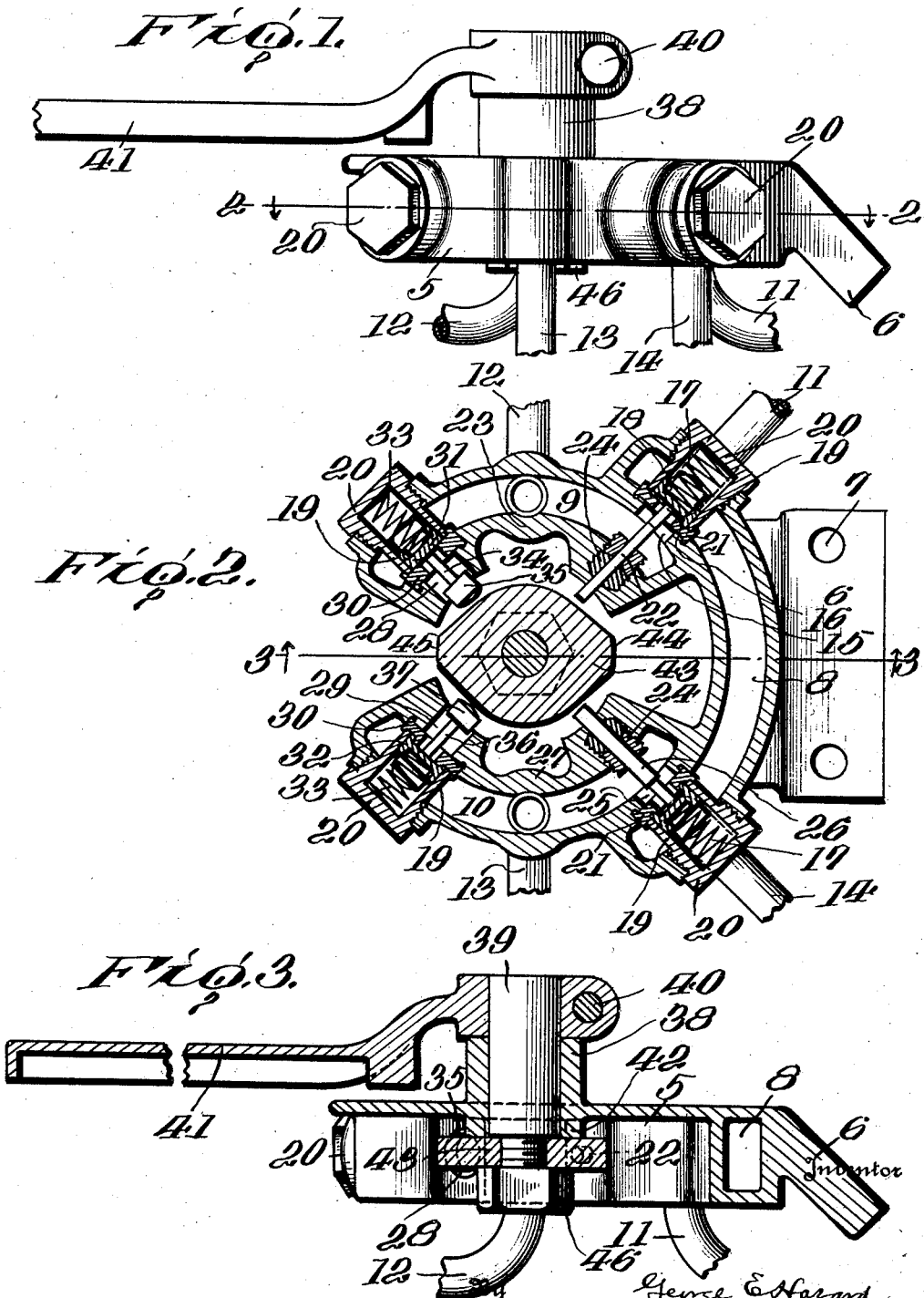

Patented Sept. 20, 1932

1,877,763

UNITED STATES PATENT OFFICE

GEORGE EDGAR HAZARD, OF ROCHESTER, NEW YORK, ASSIGNOR TO KELLOGG MANUFACTURING COMPANY, OF ROCHESTER, NEW YORK

VALVE

Application filed February 1, 1928. Serial No. 251,184.

This invention relates to improvements in valves and more particularly to an air valve assembly used for the purpose of controlling the admission and escape of air to and from the opposite sides of a piston mounted for reciprocatory movement in a cylinder.

The present air valve is primarily intended for use with the air operated tire changer which is illustrated and described in my pending application bearing Serial Number 230,912 wherein there is a piston adapted to operate the arms which expand and contract the vehicle wheel rim for the purpose of mounting and demounting the tire therefrom. In the tire changer air is delivered to the opposite sides of the piston for the purpose of driving the piston upwardly or downwardly to bring about the expansion or contraction of the rim by the arms.

The primary object of the present invention is the provision of an air valve which is cheap and simple of construction and is far superior to those now in use as it is absolutely airtight and is much more rapid in operation and additionally is very easily serviced in case any trouble arises which calls for repair or adjustment.

Another and further object of the invention is the provision of a valve which is highly efficient in operation and which automatically delivers air to one side of the piston while purging the air from the cylinder at the opposite side of the piston.

Other objects, novel features of construction and improved results of the invention will appear from the following description and accompanying drawing.

In the drawing:

Figure 1 is a view in side elevation of the improved valve.

Figure 2 is a horizontal sectional view taken on the line 2—2 of Figure 1 looking in the direction indicated by arrow.

Figure 3 is a vertical sectional view taken on the line 3—3 of Figure 2 looking in the direction indicated by arrow.

Reference being now had to the drawing which illustrates a preferred embodiment of the invention, it will be seen that there is provided a main casing or housing 5 upon one side of which is formed a bracket 6 having openings 7 for screw bolts or the like by means of which the valve can be easily and quickly attached to a machine or any other suitable support.

Reference being had to Figure 2, it will be seen that there is provided three semi-circular air chambers 8, 9, and 10 which are cast or formed integrally with the main valve housing or casting 5. The air chamber 8 may be well termed the main air chamber inasmuch as this chamber receives air from a compressor (not shown) or other suitable source of supply through the conduit or pipe 11 and air under pressure is constantly present in this chamber.

The air chamber 9 might be well termed the cylinder top air chamber as this chamber is constantly in communication with the top of the cylinder through the medium of a pipe or conduit 12.

The air chamber 10 might be well termed the cylinder bottom air chamber as this chamber is constantly in communication with the bottom of the cylinder below the piston through the medium of the pipe or conduit 13.

A fourth conduit 14 is shown and is in communication with the main air chamber 8. This conduit is used for the delivery of air, when desired, to a vehicle tire for the purpose of inflating the tire and a suitable valve (not shown) should be provided somewhere in the conduit 14 for controlling the passage of air therethrough.

Communication between the main air chamber and the cylinder top air chamber is had through an opening 15 which opening is normally closed by a valve 16 which is held upon its seat by a coil spring 17, one end of which engages the upper cup shaped valve top 18 while its opposite end is retained within the inwardly extending cage 19 of the screw plug 20. A valve seat 21 surrounds the opening 15 and is held firmly in place through engagement with the lower end of the cage housing 19. It will be readily apparent that when the plug 20 is screwed tightly down its cage portion 19 will engage and hold the valve seat 21 in place.

The valve 16 is provided with an elongated stem 22 which extends downwardly through the opening 15 through the air chamber 9 outwardly through the inner wall 23 of the air chamber 9. A suitable packing 24 is provided to prevent the escape of air around the stem.

Communication is provided between the air chamber 8, at its opposite end with the air chamber 10 through a suitable opening 25 which is normally closed by a valve 26 which valve is of a similar construction to the valve 16 and there is present in respect to this valve a similar coil spring 17, screw plug 20, valve seat 21 and elongated valve stem 26 which passes outwardly through the inner wall 27 of the air chamber 10 through a suitable packing 24 as is the case in respect to the valve 16.

The air chambers 9 and 10 at their ends opposite to the inlet openings 15 and 25 from the main air chamber 8 are provided with outlet openings 28 and 29 respectively to atmosphere. These outlet openings are in the inner walls of these two chambers and the inner ends of these openings are provided with surrounding valve seats 30 held in place by the cage portions 19 of the screw plugs 20. The opening 28 is normally closed by a valve 31 while the opening 29 is normally closed by a valve 32. Both of these valves have mounted above them coil springs 33 of a similar construction to the previously described coil spring 17 and which are similarly mounted.

The valve 31 is provided with an elongated stem 34 carrying a plunger 35 adapted for reciprocation in the opening 28 and normally extending beyond the inner end thereof.

The valve 32 is provided with an elongated stem 36 provided with a plunger 37 adapted for reciprocation in the opening 29 and normally extending beyond the inner end thereof.

The valve housing or casting 5 is provided with an upwardly extending collar or flange 38 in which is rotatably mounted a stub shaft 39 which extends above the collar and to which is suitably clamped through the medium of a bolt 40 the inner end of the operating handle 41. The lower end of the stub shaft extends downwardly through the housing 5 through a short flange or collar 42 and adjacent its lower end carries a cam 43 having two high spots 44 and 45. This cam is held in place upon the stub shaft by a bolt 46 and is rotatable with the stub shaft.

By reference to Figure 2 it will be seen that the entire valve housing 5 is approximately the shape of a horse shoe and that the stub shaft 39 extends centrally downwardly between the air chambers 9 and 10 and that the cam 43 is consequently so positioned that upon rotation of the cam it will engage the protruding ends of the valve stems 22 and 26 and the protruding ends 35 and 37 of the plungers.

*Operation*

With the parts shown in the positions illustrated in the drawings, particularly Figure 2, it will be seen that the handle 41 has been positioned to put the cam 43 in a neutral position and that all of the valves are in closed position.

Let us assume that it is desired to deliver air to the top of the cylinder above the piston for the purpose of driving the piston downwardly.

The operating handle 41 is grasped and oscillated to cause the high spot 44 of the cam 43 to engage the lower end of the elongated stem 22 of the valve 16 and lift this valve from its seat. With the positioning of the cam to bring about the opening of the valve 16 the oppositely positioned high spot 45 of the cam has automatically engaged the plunger 37 and lifted the valve 32.

As air under pressure is constantly in the chamber 8 this air will pass downwardly through the opening 15 to the air chamber 9 and from there through the pipe 12 to the top of the cylinder above the piston while the cylinder below the piston is allowed to purge itself through the pipe or conduit 13 into the chamber 10 and from this chamber to atmosphere through the opening 29, which is opened by reason of the lifting of the valve 32.

From the foregoing it will be readily apparent that a reversal of the direction of the piston is had by merely oscillating the operating handle 41 to cause the high spots of the cam to engage the valve stem 26 and valve plunger 35 to open the valves 26 and 31 respectively, thus allowing the delivery of high pressure to the cylinder below the piston and at the same time permitting the cylinder above the piston to purge itself through the opening 28.

In the meantime the valves 16 and 32 have automatically been closed by reason of the expansion of the coil springs 17 and 33.

When the operation of the tire changing tool or machine has been completed the vehicle tire can be inflated by air delivered from the air chamber 8 through the pipe 14 by the mere manipulation of any well known form of valve.

From the foregoing it will be seen that I have provided a valve which is very rapid in its operation and operates to simultaneously deliver air to a cylinder at one side of the piston and to purge the cylinder at the other side of the piston.

By reason of the screw plugs 20 the construction is such that all of the valves can be quickly and easily gotten at for repair or adjustment which is a highly desirable feature of construction.

It will be further seen that the construction is such that the possibility of leakage is remote.

Having thus described my invention what I claim and desire to secure by Letters Patent is:

1. A valve comprising a housing having a main air chamber of an arcuate shape and two supplemental air chambers of a similar configuration in communication therewith, said chambers forming a housing of a shape approximate to a horseshoe the communication between the supplemental chambers and the main chamber being positioned at one end of said supplemental chambers and at opposite ends of the main chamber and being normally closed by valves, escape openings in the opposite ends of each of said supplemental chambers and being normally closed by valves all of said valves having stems extending into said horseshoe-shaped housing, outlet delivery pipes constantly in communication with said supplemental chambers intermediate their ends, and means comprising a single cam to simultaneously open the escape valve of one supplemental chamber and the inlet valve of the other supplemental chamber or to simultaneously open the inlet valve of the first-named supplemental chamber and the escape valves of the last-named supplemental chamber, for the purpose described.

2. A valve comprising a housing having a main air chamber and two supplemental air chambers, inlet openings providing communication between said supplemental chambers and said main chamber, valves normally closing said inlet openings and provided with elongated stems extending through the inner walls of said supplemental chambers and beyond the same, escape openings in the inner walls of said supplemental chambers provided with valves normally closing them, said valves having elongated stems extending through beyond the inner walls of said supplemental chambers through said escape openings, outlet delivery pipes for said supplemental chambers constantly in communication therewith, a single cam having oppositely positioned high spots rotatably mounted between said supplemental chambers, and means to oscillate said cam to cause said high spots to engage and operate the stem of the escape valve of one supplemental chamber and the stem of the inlet valve of the other supplemental chamber, or to engage and operate the stem of the inlet valve of the first-mentioned supplemental chamber and the stem of the exhaust valve of the second named supplemental chamber; said single cam thereby operating four valves for the purpose described.

3. A valve of the character described comprising a housing having a single main air chamber and two supplemental air chambers in communication therewith, valves normally closing the communication between said chambers, each of said supplemental air chambers provided with outlet delivery pipes and escape openings, valves normally closing said escape openings, said inlet and escape openings provided with seats cooperating with their respective valves, screw plugs in the main air chamber above the inlet valves and screw plugs in the supplemental chambers above said escape valves, said screw plugs provided with elongated cages engaging and holding their respective valve seats in place, coil springs mounted between the tops of said valves and the inner faces of said screw plugs, all of said valves provided with elongated stems extending inwardly through and beyond the inner walls of said supplemental chambers, a single cam having oppositely positioned high spots rotatably mounted intermediate said supplemental chambers and the inwardly extending ends of the said valve stems, and means to rotate said cam to cause the openings of the escape valve of one supplemental chamber and the inlet valve of the other supplemental chamber, for the purpose described.

4. A valve comprising a housing of a shape approximately similar to a horse shoe made up of a main air chamber of an arcuate shape and two supplemental air chambers of a similar configuration in communication therewith, valves normally closing inlet openings between the supplemental air chambers and the main air chambers, outlet delivery pipes constantly in communication with said supplemental air chambers, each of said supplemental air chambers provided with escape openings to atmosphere and valves normally closing said openings, said inlet and escape valves provided with elongated stems extending inwardly through and beyond the inner walls of said supplemental chambers into said horseshoe-shaped housing, a single cam having oppositely positioned high spots rotatably mounted centrally of said horse shoe shaped housing and between the extending valves ends, and means to rotate said cam for the purpose of simultaneously admitting air to one supplemental chamber and purging air from the other supplemental chamber, for the purpose described.

5. A valve comprising a single main air chamber of an arcuate shape and two supplemental air chambers of a similar configuration in communication therewith, said chambers forming a housing of a shape approximate to a horse shoe, valves normally closing the communication between said chambers, each of said supplemental chambers provide with an outlet delivery pipe and an escape opening, valves normally closing said escape openings, all of said valves having elongated stems extending inwardly through the inner walls of said supplemental chambers and into said housing, a single cam rotatably mounted and centrally disposed within said housing for operative engagement with the ends of all of said valves, and said cam having oppositely positioned high spots to cause upon rotation said high spots to engage the stem of one escape valve of one supplemental chamber and the stem of the inlet valve of the other supplemental chamber for the purpose described.

In testimony whereof I hereunto affix my signature.

GEORGE EDGAR HAZARD.